(12) United States Patent
Laws

(10) Patent No.: US 9,753,163 B2
(45) Date of Patent: Sep. 5, 2017

(54) SIMULTANEOUS MARINE VIBRATORS

(71) Applicant: WESTERNGECO L.L.C., Houston, TX (US)

(72) Inventor: Robert Montgomery Laws, Cambridge (GB)

(73) Assignee: WESTERNGECO L.L.C., Houston, TX (US)

(*) Notice: Subject to any disclaimer, the term of this patent is extended or adjusted under 35 U.S.C. 154(b) by 148 days.

(21) Appl. No.: 14/366,255

(22) PCT Filed: Jan. 11, 2013

(86) PCT No.: PCT/IB2013/050278
§ 371 (c)(1),
(2) Date: Jun. 17, 2014

(87) PCT Pub. No.: WO2013/105062
PCT Pub. Date: Jul. 18, 2013

(65) Prior Publication Data
US 2014/0334257 A1 Nov. 13, 2014

Related U.S. Application Data

(60) Provisional application No. 61/585,959, filed on Jan. 12, 2012.

(51) Int. Cl.
G01V 1/38 (2006.01)
G01V 1/04 (2006.01)
G01V 1/00 (2006.01)

(52) U.S. Cl.
CPC .............. *G01V 1/04* (2013.01); *G01V 1/3861* (2013.01); *G01V 1/005* (2013.01); *G01V 1/38* (2013.01)

(58) Field of Classification Search
CPC .... G01V 1/3861; G01V 1/3808; G01V 1/006; G01V 1/38; G01V 1/005
(Continued)

(56) References Cited

U.S. PATENT DOCUMENTS 4,168,485 A 9/1979 Payton et al.
4,598,392 A 7/1986 Pann
(Continued)

FOREIGN PATENT DOCUMENTS

EA 201000707 A1 12/2010
EP 0400775 12/1990
(Continued)

OTHER PUBLICATIONS

Examination Report issued in related AU application No. 2013208683 mailed Oct. 13, 2015.
(Continued)

*Primary Examiner* — Ian J Lobo

(57) ABSTRACT

Methods and apparatuses for acquiring marine seismic data to generate images or determine properties of an interior section of the Earth using simultaneous marine vibrator sweeps and methods for processing the acquired seismic data. Phase of sweeps produced by the marine vibrator(s) are controlled to provide for removal of crosstalk. The phases between marine vibrator sweeps may be random or controlled to have a predetermined/desired phase difference. The predetermined phases may be determined to minimize the crosstalk between sweeps based on known seismic velocity of the survey area.

14 Claims, 5 Drawing Sheets

(58) Field of Classification Search
USPC ................................. 367/23, 24; 181/111
See application file for complete search history.

(56) References Cited

U.S. PATENT DOCUMENTS

| | | | |
|---|---|---|---|
| 4,680,741 | A | 7/1987 | Wales et al. |
| 4,715,020 | A | 12/1987 | Landrum |
| 4,782,446 | A | 11/1988 | Ehler et al. |
| 4,918,668 | A | 4/1990 | Sallas |
| 5,410,517 | A | 4/1995 | Andersen |
| 5,761,152 | A | 6/1998 | Jacobsen et al. |
| 5,924,049 | A | 7/1999 | Beasley et al. |
| 6,028,818 | A | 2/2000 | Jeffryes |
| 6,049,507 | A | 4/2000 | Allen |
| 6,151,556 | A | 11/2000 | Allen |
| 6,152,256 | A | 11/2000 | Favret et al. |
| 6,512,980 | B1 | 1/2003 | Barr |
| 6,942,059 | B2 | 9/2005 | Smith |
| 6,961,284 | B2 | 11/2005 | Moldoveanu |
| 7,050,356 | B2 * | 5/2006 | Jeffryes .................. G01V 1/005 367/39 |
| 7,218,572 | B2 | 5/2007 | Parkes |
| 7,257,049 | B1 | 8/2007 | Laws et al. |
| 7,295,490 | B1 | 11/2007 | Chiu et al. |
| 7,492,665 | B2 | 2/2009 | Robertsson et al. |
| 7,859,945 | B2 | 12/2010 | Sallas et al. |
| 7,876,642 | B2 | 1/2011 | Robertsson et al. |
| 8,203,906 | B2 | 6/2012 | Robertsson et al. |
| 8,331,192 | B2 | 12/2012 | Robertsson et al. |
| 8,750,073 | B2 | 6/2014 | Robertsson et al. |
| 9,128,209 | B2 | 9/2015 | Dowle |
| 9,164,185 | B2 | 10/2015 | Coste et al. |
| 9,547,097 | B2 | 1/2017 | Laws |
| 2001/0020218 | A1 | 9/2001 | Cosma |
| 2002/0008197 | A1 | 1/2002 | Michael |
| 2004/0013037 | A1 | 1/2004 | Vaage |
| 2004/0089499 | A1 | 5/2004 | Smith |
| 2004/0136266 | A1 | 7/2004 | Howlid et al. |
| 2006/0076183 | A1 | 4/2006 | Duren et al. |
| 2006/0164916 | A1 * | 7/2006 | Krohn .................... G01V 1/005 367/41 |
| 2007/0133354 | A1 | 6/2007 | Bagaini et al. |
| 2008/0228402 | A1 * | 9/2008 | Ferber .................. G01V 1/3808 702/14 |
| 2008/0229402 | A1 | 9/2008 | Smetters et al. |
| 2009/0076730 | A1 | 3/2009 | Johnson et al. |
| 2009/0168600 | A1 | 7/2009 | Moore et al. |
| 2009/0323469 | A1 | 12/2009 | Beasley |
| 2010/0067326 | A1 | 3/2010 | Iranpour et al. |
| 2010/0085836 | A1 | 4/2010 | Bagaini et al. |
| 2010/0110830 | A1 | 5/2010 | Thomson |
| 2010/0118647 | A1 | 5/2010 | Tenghamn |
| 2010/0142317 | A1 | 6/2010 | Moldoveanu et al. |
| 2010/0195434 | A1 | 8/2010 | Menger et al. |
| 2011/0002193 | A1 | 1/2011 | Storteig et al. |
| 2011/0110188 | A1 | 5/2011 | Robertsson et al. |
| 2011/0158042 | A1 | 6/2011 | Moldoveanu et al. |
| 2011/0310699 | A1 | 12/2011 | Robertsson et al. |
| 2012/0033526 | A1 * | 2/2012 | Hegna .................... G01V 1/364 367/21 |
| 2012/0081998 | A1 | 4/2012 | Almaas et al. |
| 2012/0314536 | A1 * | 12/2012 | Bagaini ................ G01V 1/3808 367/20 |
| 2013/0088938 | A1 | 4/2013 | Aaron et al. |
| 2013/0336087 | A1 | 12/2013 | Laws |

FOREIGN PATENT DOCUMENTS

| | | |
|---|---|---|
| EP | 2259091 A2 | 8/2010 |
| GB | 2390902 A | 1/2004 |
| WO | 2012/123884 A2 | 9/2012 |
| WO | 2012123883 | 9/2012 |
| WO | 2012170608 A2 | 12/2012 |
| WO | 2013105062 | 7/2013 |
| WO | 2013105075 | 7/2013 |

OTHER PUBLICATIONS

Communication pursuant to Article 94(3) EPC issued in related EP application No. 13735949.3 mailed Oct. 2, 2015.
Supplemental European Search Report issued in related EP application No. 13735949.3 mailed Sep. 15, 2015.
Official Action issued in related MX application No. MX/a/2014/008480 mailed Sep. 9, 2015, and partial English translation by agent.
International Search Report and Written Opinion of PCT Application No. PCT/IB2013/050278 dated May 30, 2013: pp. 1-13.
International Search Report and Written Opinion of PCT Application No. PCT/IB2013/050332 dated Jun. 17, 2013: pp. 1-15.
Beasley, "A new look at marine simultaneous sources," The Leading Edge, Jul. 2008: pp. 914-917.
Dekok et al., "A-04: A Universal Simultaneous Shooting Technique," EAGE 64th Conference & Exhibition, May 2002: pp. 1-4.
Gulati et al., "Faster 3D VSP acquisition using simultaneous sources," SEG San Antonio Annual Meeting, 2011: pp. 1-4.
Parkes et al., "An acquisition system that extracts the earth response from seismic data," first break, Dec. 2011, vol. 29: pp. 81-87.
Robertsson et al., "On the use of multicomponent streamer recordings for reconstruction of pressure wavefields in the crossline direction," Geophysics, Sep.-Oct. 2008, vol. 73(5): pp. A45-A49.
Robertsson et al., "Z015: Full-wavefield, Towed-marine Seismic Acquisition and Applications," 74th EAGE Conference & Exhibition, incorporating SPE EUROPEC 2012, Jun. 2012: pp. 1-5.
Stefani et al., "B006: Acquisition Using Simultaneous Sources," EAGE 69th Conference & Exhibition, Jun. 2007: pp. 1-5.
Patent Examination Report No. 2 issued in the related AU application 2013208642, mailed on May 9, 2016 (3 pages).
European Search Report issued in the related EP Application 13736164.8, mailed Mar. 24, 2016 (5 pages).
European Communication 94(3) issued in the related EP Application 13736164.8, mailed Apr. 14, 2016 (8 pages).
Hampson G. et al.: "Acquisition using Simultaneous Sources", The Leading Edge, Society of Exploration Geophysicists, US, vol. 27, No. 7, Jul. 1, 2008, pp. 918-923.
Bekhout A J G: "Changing the mindset in Sesmic data acquisition", The Leading Edge, Sociey of Exploration Geophysicists, US, vol. 27, No. 7, Jul. 1, 2008, pp. 924-926, 928.
Examination Report issued in related AU application No. 2013208642 mailed May 11, 2015 (3 pages).
Official Action issued in related MX application No. MX/a/2014/008482 mailed Sep. 4, 2015, and partial English translation by agent (6 pages).
Examination report issued in the related AU application 2016203055, dated Nov. 11, 2016 (3 pages).
International Preliminary Report on patentability issued in the related PCT application PCT/IB2013/050332, dated Jul. 15, 2014 (10 pages).
Office action issued in the related RU application 2014133166, dated Jul. 26, 2016 (16 pages).
International Preliminary Report on patentability issued in the related PCT application PCT/IB2013/050278, dated Jul. 15, 2014 (8 pages).
Office action issued in the related AU application 2013208683, dated Nov. 27, 2014 (3 pages).
Examination Report for the equivalent Australian patent application No. 2015261675 issued on Oct. 31, 2016.
"Pareto principle," Wikipedia downloaded Jan. 19, 2017 from https://en.wikipedia.org/w/index.php?title=Pareto_principle&oldid=349298535, 6pp.
Houston, et al., "OTC 5641: A Marine Digital Vibrator: Part II—Implementation," 20th Annual Offshore Technology Conference, May 1988: pp. 223-226.
Laws, et al., "B026: Are Seismic Sources Too Loud?" 70th EAGE Conference & Exhibition, Jun. 2008, pp. 1-5.
"LGL Report TA4604-a: Environmental Assessment of Marine Vibroseis," LGL Ltd., environmental research associated and Marine Acoustics Inc., Apr. 2011: pp. 1-207.

(56) References Cited

OTHER PUBLICATIONS

Southall, et al., "Marine Mammal Noise Exposure Criteria: Initial Scientific Recommendations," Aquatic Mammals 2007, vol. 33 (4), pp. 411-521.

* cited by examiner

SIMULTANEOUS MARINE VIBRATORS

CROSS-REFERENCE TO RELATED APPLICATIONS

This application is a U. S. National Stage Application under 35 U.S.C. §371 and claims priority to Patent Cooperation Treaty Application No. PCT/IB2013/050278 filed on Jan. 11, 2013, which claims the benefit of U.S. Provisional Application Ser. No. 61/585,959 filed on Jan. 12, 2012, the disclosures of which are incorporated herein by reference in their entireties.

BACKGROUND

This disclosure relates to seismic surveys and seismic exploration for oil and gas. In particular, but not by way of limitation, this disclosure relates to simultaneous source activation in marine seismic surveying, in which multiple marine seismic vibrators and/or certain signal phase shifts are utilized.

Seismic exploration involves surveying subterranean geological formations for hydrocarbon deposits. A survey may involve deploying seismic source(s) and seismic sensors at predetermined locations. The seismic sources generate seismic waves, which propagate into geological formations, creating pressure changes and vibrations along the way. Changes in elastic properties of the geological formation scatter the seismic waves, changing the direction of propagation and other properties of the seismic waves. In a seismic survey, part of the energy emitted by the seismic sources reaches the seismic sensors. Some seismic sensors are sensitive to pressure changes (e.g., hydrophones); other seismic sensors are sensitive to particle motion (e.g., geophones). Seismic surveys may deploy one type of sensor or a combination of both types of sensors. In response to the detected seismic events, the seismic sensors generate seismic data, generally, in the form of electrical signals. Analysis of the seismic data may indicate the presence or absence of probable locations of hydrocarbon deposits.

Some seismic surveys are known as "marine" surveys because the survey is conducted in a marine environment. However, "marine" surveys may not only be conducted in saltwater environments; they also may be conducted in fresh water and brackish water environments. In one type of marine survey, called a "towed-array" survey, an array of seismic sensor-containing streamers and sources is towed behind a survey vessel.

Other seismic surveys are known as "land" surveys because the surveys are conducted on land environments. Land surveys may use dynamite, seismic vibrators and/or the like as sources. In land surveys seismic sensors/arrays of seismic sensor-containing cables are laid on the ground to receive seismic signals/waves generated by the seismic sources. The seismic signals may be converted, digitized, stored, or transmitted by sensors to data storage and/or processing facilities nearby, e.g. a recording truck. Land surveys may use wireless receivers to avoid the limitations of cables. Seismic surveys may be conducted in areas between land and sea, which are referred to as "transition zones". Other types of seismic surveys that incorporate both hydrophones and geophones may be conducted on the seabed.

In a conventional towed marine survey using impulsive sources (e.g. an airgun) as a seismic source, a delay is introduced between the firing of one seismic source and the firing of the next seismic source. The delay is selected so as to be of sufficient duration to permit the energy created by the firing of one seismic source to decay to an acceptable level before the energy that is associated with the firing of next seismic source arrives at the seismic sensors. The use of such delays, however, imposes constraints on the rate at which the seismic data may be acquired. For a towed marine survey, these delays require a minimum inline shot interval because the minimum speed of the survey vessel is limited.

To overcome those limitations, simultaneous source activation methods were recently developed. In the simultaneous source activation methods, the delays between source activations/firings are greatly reduced or practically nonexistent. The use of simultaneous sources may increase the data acquisition speed in the seismic survey, lower the overall cost, and provide many other benefits. In simultaneous source activation methods, one seismic source is selected during processing, and seismograms relating to other seismic sources are cancelled by data processing methods to produce a seismogram related to the selected seismic source.

In simultaneous source activation methods, the resulting seismic data (seismograms) from simultaneous sources produce overlapping responses due to the use in the seismic survey of different seismic sources that are fired without the delay described above. In order to separate the seismograms from two or more sources activated at proximal times, there needs to be some feature that distinguishes the seismograms. This feature can come from differences in the impulsive seismogram or from differences in the source output signature or both.

If the seismograms differ significantly, they may be separable using knowledge that some parts of the signal space are occupied only by the part of the seismogram that originates from one of the simultaneous sources. For example, as disclosed in U.S. Pat. No. 5,924,049, to provide for such a significant difference, the sources may emit similar pulses, but are placed at opposite ends of a seismic streamer so that they are separated by a large physical distance. In such a configuration, the two summed simultaneous seismograms occupy predominantly different parts of the Fk spectrum and can be separated by Fk dip filtering. In this configuration, the source signatures of the two simultaneous sources are not well differentiated, but the seismograms from the two are.

Another method is shot-time "dithering," where relatively small delays (random delays, for example) are introduced between the firings of seismic sources (i.e., the method involves the use of source dithering). The resulting seismic traces are collected into a domain that includes many firings of each seismic source. The traces are aligned such that time zero corresponds to the firing time for a specific source so that the signal(s) acquired due to the specific seismic source appears coherent while the signal(s) acquired due to the other seismic sources appear incoherent. As such, in the dithering methods, the acquired signals may be separated (related to a seismic source) based on coherency. In a typical seismic marine survey, a shot record may last ten (10) seconds. The average time delay or "dithering" time in a dithering-multi-seismic source marine survey may be in the range of one hundred (100) milliseconds or up to many seconds.

In the context of this disclosure, 'simultaneous' means sufficiently close in time that the reflected seismic signals generated from two shots (or two sources) overlap in time. In some cases, the seismic sources are close to each other and fired at almost the same time. A shot refers to the activation of a seismic source, which source may be a seismic vibrator, an airgun, a watergun and/or the like.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

This disclosure relates to methods and apparatuses for simultaneous source activation in marine seismic surveying, more specifically, but not by way of limitation, simultaneous source seismic surveys where multiple seismic vibrators and certain signal phase shifts are utilized.

In some embodiments of the present invention, seismic marine vibrators are used to produce sweeps of frequencies. In an embodiment of the present invention, the emitted signal phase at each frequency in a frequency sweep from a marine seismic vibrator is controlled. This phase control may be applied to each shot and/or each marine seismic vibrator in the seismic survey. In an embodiment of the present invention, the same phase shift is applied to all frequencies in a frequency sweep produced by a marine seismic vibrator, but the phase shift is varied for each of the other marine seismic vibrators in the survey and/or each shot produced by a seismic vibrator in the seismic survey.

In some embodiments of the present invention, phase shifts are selected for each marine seismic vibrator and/or each shot and configured such that during a multi-channel filtering process, crosstalk between signals produced by the seismic vibartors/shots is removed/cancelled for the signal from the marine seismic vibrator that is to be cancelled in the multi-channel filtering process. As such, the embodiments of the present invention provide a method for removing or reducing an artifact (crosstalk) from a signal from a marine seismic vibrator that would otherwise remain at a higher level when the signal is cancelled in the multi-channel filtering process. Merely by way of example, as discussed previously, methods may provide that a first seismic signal generated from one shot/seismic source may be removed/cancelled from a second signal produced from another shot/seismic source. However, crosstalk between the first and the second signals may still remain. In an embodiment of the present invention, a phase shift between the first and second signals is configured so that the crosstalk does not occur, is reduced and/or so can be removed/cancelled by processing.

In an embodiment of the present invention, the selected phase shifts provide that crosstalk is localized near the signal that causes the crosstalk. In certain embodiments, the selected phase shifts are configured to provide that the crosstalk is zero even for small fold.

BRIEF DESCRIPTION OF THE DRAWINGS

Embodiments of this disclosure are described with reference to the following figures. The same numbers are used throughout the figures to reference like features and components. A better understanding of the methods or apparatuses can be had when the following detailed description of the several embodiments is considered in conjunction with the following drawings, in which.

DETAILED DESCRIPTION

Figure 1:
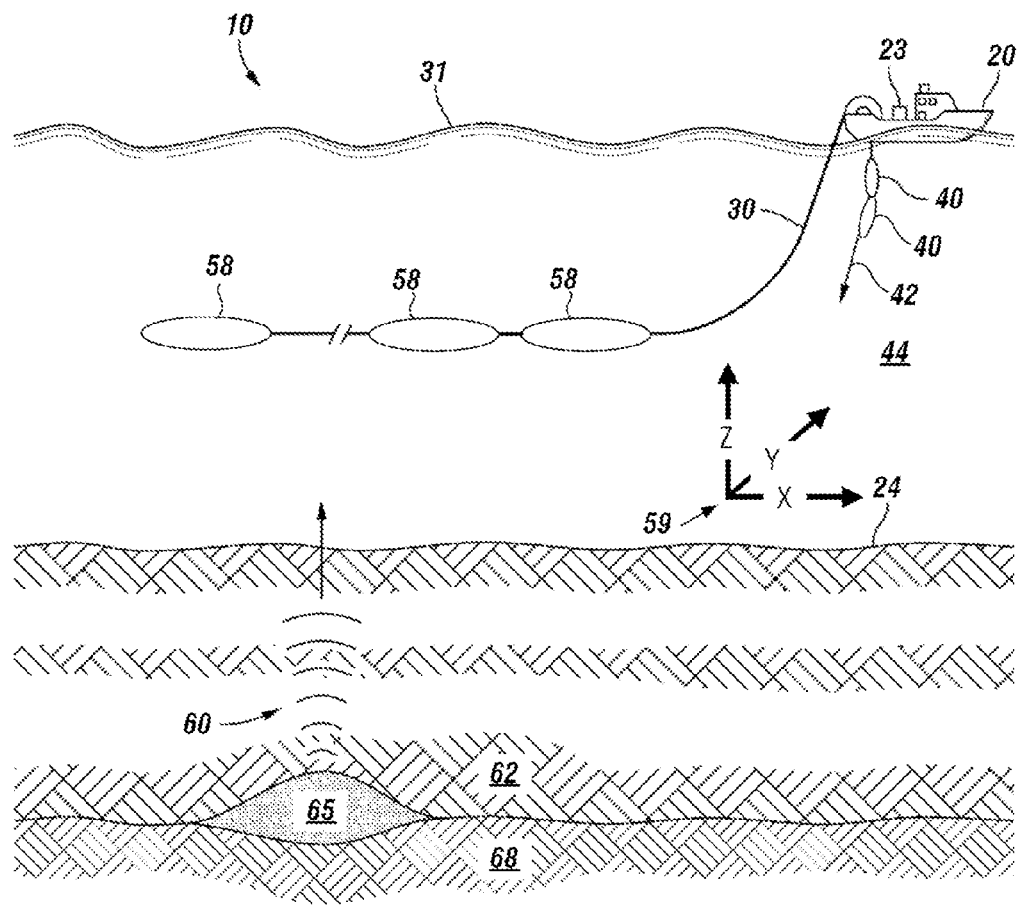
FIG. 1 illustrates a seismic acquisition system in a marine environment that may be used in an embodiment of the present invention.

Reference will now be made in detail to embodiments, examples of which are illustrated in the accompanying drawings and figures. In the following detailed description, numerous specific details are set forth in order to provide a thorough understanding of the subject matter herein. However, it will be apparent to one of ordinary skill in the art that the subject matter may be practiced without these specific details. In other instances, well-known methods, procedures, components, and systems have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step. The first object or step, and the second object or step, are both objects or steps, respectively, but they are not to be considered the same object or step.

The terminology used in the description of the disclosure herein is for the purpose of describing particular embodiments only and is not intended to be limiting of the subject matter. As used in this description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It is understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments maybe practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but it could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to, portable or fixed storage devices, optical storage devices, wireless channels, and various other mediums capable of storing, containing, or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

FIG. 1 depicts a marine-based seismic data acquisition system 10. In system 10, a survey vessel 20 tows one or more seismic streamers 30 (one streamer 30 being depicted in FIG. 1) behind the vessel 20. It is noted that the streamers 30 may be arranged in a spread in which multiple streamers 30 are towed in approximately the same plane at the same depth. As another non-limiting example, the streamers may be towed at multiple depths, such as in an over/under spread.

The seismic streamers 30 may be several thousand meters long and may contain various support cables (not shown), as well as wiring and/or circuitry (not shown) that may be used to support communication along the streamers 30. In general, each streamer 30 includes a primary cable into which are mounted seismic sensors 58 that record seismic signals. The streamers 30 contain seismic sensors 58, which may be hydrophones to acquire pressure data, geophones to acquired motion data, or multi-component sensors. For example, sensors 58 may be multi-component sensors, with each sensor capable of detecting a pressure wavefield and at least one component of a particle motion that is associated with acoustic signals that are proximate to the sensor. Examples of particle motions include one or more components of a particle displacement, one or more components (inline (x), crossline (y) and vertical (z) components (see axes 59, for example)) of a particle velocity and one or more components of particle acceleration.

The multi-component seismic sensor may include one or more hydrophones, geophones, particle displacement sensors, particle velocity sensors, accelerometers, pressure gradient sensors, or combinations thereof.

The marine seismic data acquisition system 10 includes one or more seismic sources 40 (two seismic sources 40 being depicted in FIG. 1), such as air guns or other sources. The seismic sources 40 may be coupled to, or towed by, the survey vessel 20. The seismic sources 40 may operate independently of the survey vessel 20, in that the sources 40 may, just as some examples, be coupled to other vessels or buoys As the seismic streamers 30 are towed behind the survey vessel 20, acoustic signals 42 (an acoustic signal 42 being depicted in FIG. 1), often referred to as "shots," are produced by the seismic sources 40 and directed down through a water column 44 into strata 62 and 68 beneath a water bottom surface 24. The acoustic signals 42 are then reflected from the various subterranean geological formations, such as a formation 65 that is depicted in FIG. 1.

The incident acoustic signals 42 that are generated by the sources 40 produce corresponding reflected acoustic signals, or pressure waves 60, which are sensed by the seismic sensors 58. It is noted that the pressure waves that are received and sensed by the seismic sensors 58 include "up going" pressure waves that propagate to the sensors 58 without reflection from the air-water boundary 31, as well as "down going" pressure waves that are produced by reflections of the pressure waves 60 from an air-water boundary 31.

The seismic sensors 58 generate signals (digital signals, for example), called "traces," which indicate the acquired measurements of the pressure wavefield and particle motion. It is noted that while the physical wavefield is continuous in space and time, traces are recorded at discrete points in space, which may result in spatial aliasing. The traces are recorded and may be at least partially processed by a signal processor in unit 23 that may be deployed on the survey vessel 20, in accordance with some embodiments. For example, a particular seismic sensor 58 may provide a trace, which corresponds to a measure of a pressure wavefield by a hydrophone; and the sensor 58 may provide (depending the sensor configurations) one or more traces that correspond to one or more components of particle motion.

One of the goals of the seismic acquisition is to build up an image of a survey area for purposes of identifying subterranean geological formations, such as the geological formation 65. Subsequent analysis of the representation may reveal probable locations of hydrocarbon deposits in subterranean geological formations. Depending on the particular survey design, portions of the analysis of the representation may be performed on the seismic survey vessel 20, for example, by the signal processor in unit 23. In other surveys, the representation may be processed by a seismic data processing system (such as a seismic data processing system 700 in FIG. 7, further described below) that may be, for example, located in an office on land or on the vessel 20.

A particular seismic source 40 may be formed from an array of seismic source elements (such as air guns or marine seismic vibrators, for example) that may be arranged in strings (gun strings, for example) of the array. A particular seismic source 40 may also be formed from one air gun, or from a predetermined number of air guns, from an array, or from multiple arrays, etc. Regardless of the particular composition of the seismic sources, the sources may be fired in a particular time sequence during the survey.

Theoretically, either impulsive sources or continuous sources can be used in seismic surveys. In practice, both impulsive sources and continuous sources are used in seismic surveys performed on land. However, continuous sources (e.g. marine seismic vibrators) were almost never used in commercial marine seismic surveys until the invention of the type of marine seismic vibrators as disclosed in pending patent application, WO PCT, Application Number: PCT/IB2012/051153 filed on 12 Mar. 2012, which is incorporated here by reference for all purposes.

Prior art methods related to simultaneous marine sources all used impulsive sources because there were no practical continuous sources for marine seismic surveys. However, it was found that the methods that are useful for impulsive sources are not suitable for continuous sorces, such as marine vibrators.

Figure 2:
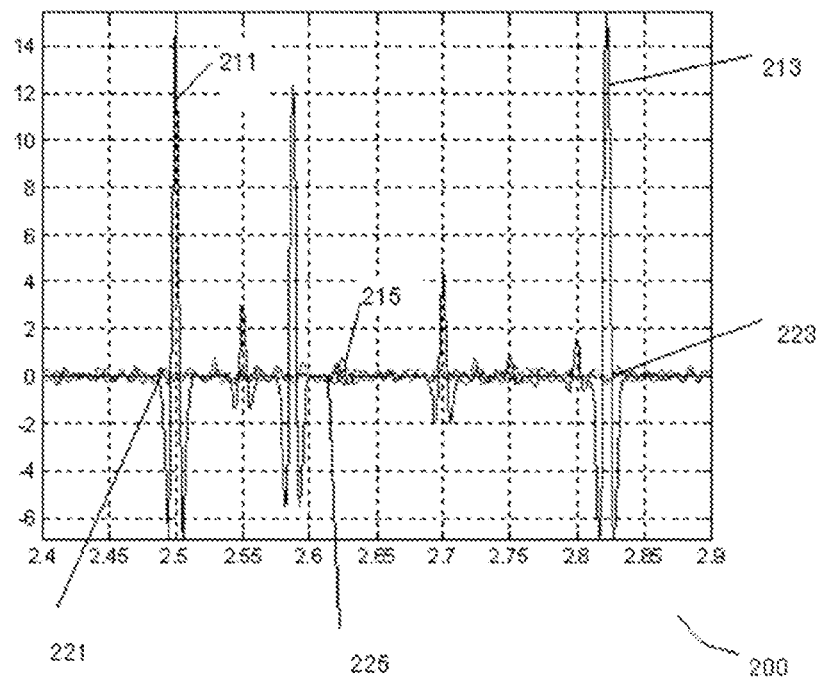
FIG. 2 illustrates an example of a seismogram produced using a prior art "dithering" method with marine vibrators.

FIG. 2 illustrates an example of a seismogram 200 produced from data acquired using a dithering method with marine vibrators. The horizontal axis is recording time in seconds and the vertical axis is the signal amplitude in a dimensionless unit. The seismogram 200 has 100 folds. A fold is a measure of the redundancy of common midpoint seismic data, equal to the number of offset receivers that record a given data point or in a given bin and are added during stacking to produce a single trace. For discussion purposes, a few features 211, 213 and 215 are identified in the seismogram 200. As shown, the residue crosstalk (wiggles 221, 223, 225) are also identified. The residue crosstalks are the incompletely removed signals resulting from another source/shot other than the source/shot for which the separated seismogram is being processed. The crosstalk is spread over the entire recording from 2.4 seconds through 2.9 seconds. For strong features, (e.g. signals 211 at 2.50 sec, 213 at 2.82 sec) the crosstalk is well tolerated, where the signals (211 or 213) are twenty or more times stronger than the residual crosstalk (221 or 223). However, weak features can be overwhelmed by the crosstalk. In this example, as shown in FIG. 2, the weak feature 215 at 2.62 sec is almost overrun by the crosstalk 225.

It has been discovered that in time dithering of impulsive seismic sources, the dithering time must be large enough to give even the lowest frequencies a significant phase shift so that they become incoherent when synchronized by times other than their own firing times. When time dithering is applied to continuous sources, the dithering delay means that the beginning of a sweep is delayed and the sweep itself remains the same. This means that the same time delay is applied to all frequencies in the sweep. For high frequencies in the sweep, the delay would be unnecessarily large compared to their periods. This also implies a low-frequency limit to the separability of seismograms.

The unnecessarily large delays for high frequencies in the sweep can spread the crosstalk to other parts of the recording, as shown in FIG. 2. In the case where the two seismograms are similar (because the sources are spatially close; which is a reason for using the dithering method), such spreading of the crosstalk is undesirable because the crosstalk from a high amplitude event can overwhelm low amplitude events in other parts of the seismogram. As such, the time dithering method has some limitations when it is used with continuous sources.

It has been found that when marine seismic sources are activated at times that are proximal to one another, the response of the earth and recording system is generally linear. This means that a seismogram produced from two or more sources being activated nearly simultaneously is equal to the sum of the individual seismograms that would have been obtained had the sources been fired separately/independently. This property may be used to design new methods for acquiring seismic recordings with simultaneous continuous sources and for separating the obtained recordings or using them directly for other purposes.

In some embodiments of the present invention, the phase of the signal produced by a seismic source(s) may be controlled during a sweep. Such embodiments provide for the selection/generation of phase shifts between signals produced by marine vibrators and/or shots that are just large enough to achieve a desired separability at each frequency. For example, phase shifts for a frequency(ies) in a seismic signal/seismic sweep produced by a seismic source may be different than the phase shift for another seismic frequency(ies) in the produced signal/sweep. Such embodiments may also provide for phase shifts between marine vibrators and/or shots that can either be random (over the range 0-2π) or that can be carefully selected so that the crosstalk tends to zero during the processing. These controlled phase-shifting methods do not have the low frequency limitation or the spreading of crosstalk that occurs in the dithering methods. Moreover, in controlled phase shift methods, the sources may be spatially close together, as occurs/is necessary in some seismic surveys.

In some embodiments of the present invention, as an example, seismic data may be recorded from two simultaneous flip-flop sources (two vibrators) using a sweep function that consists of a basic sweep with additional phase shifts of $\phi(f,n,v)$, where f is the frequency, n is the shot number and v is the source number. The basic sweep is not a concern of the current invention, so it can be any type of sweep. In flip-flop shooting, the two sources can be spatially located close to each other, for example by a distance of the order of fifty (50) meters, or located at the same place but separated vertically. In these arrangements, the individual seismograms due to the different sources are similar to one another.

In an embodiment of the present invention, an additional phase shift $\phi(f,n,v)$ can, in principle, depend on frequency, shot number, and source number. In an embodiment of the present invention, the combined seismogram is recorded, which seismogram comprises the sum of the 'flip' and 'flop' seismograms $S(f,n,1)$ and $S(f,n,2)$. In certain aspects, the basic sweep function is deconvolved (without accounting for the additional phase shifts) from the raw data to produce the combined impulsive seismogram $Srec(f,n)$, which still contains the additional phase shifts, as described in (Equation 1).

$$Srec(f,n)=S(f,n,1)\cdot\exp(i\phi(f,n,1))+S(f,n,2)\cdot\exp(i\phi(f,n,2)) \qquad \text{Eq. 1}$$

In certain embodiments of the present invention, multi-channel filtering that uses combined data from several shots may be performed. In such embodiments, the number of shots going into the multi-channel filtering may be N. $\phi(f,n,1)$, the phase for the first source, may be kept at 0, and $\phi(f,n,2)$, the phase for the second source, may be distributed widely over the range of $0$-$2\pi$.

$\phi(f,n,2)=\phi_{rand}(n,2)$ where $\phi_{rand}$ has values between 0 and $2\pi$.      Eq. 2

Such embodiments are convenient since it is operationally straightforward to apply a single-phase shift to an entire sweep. When N such seismograms are added, each with a different phase, the average of 'cancelled' seismogram tends to zero as N tends to infinity.

Scan=$\Sigma \exp(i \cdot \phi_{rand}(n,v))$ tends to 0 for large $N$ for all $f$      Eq. 3

When the N seismograms are stacked (added), the parts due to the first source $S(f,n,1)$. $\Sigma \exp(i\phi(f,n,1))$ will add up, which is $N \cdot S(f,n,1)$, while the parts due to the second source $S(f,n,2) \cdot (\Sigma \exp(i\phi(f,n,2)))$ are "cancelled" as in Eq. 3. This way, in accordance with an embodiment of the present invention, the seismogram(s) due to the first source may be obtained.

Similarly, in some aspects of the present invention, the seismograms may be multiplied by a phase shift operator $\exp(-i\phi(f,n,2))$ during the data processing, which will cancel the random phases for the parts due to the second source, but add the random phases for the parts due to the first source. The stacking will similarly add up the parts due to the second source while canceling the parts due to this first source. As a result, in aspects of the present invention, by controlling the phase shift of the source signals, the seismograms due to the second source may be obtained.

Figure 3:
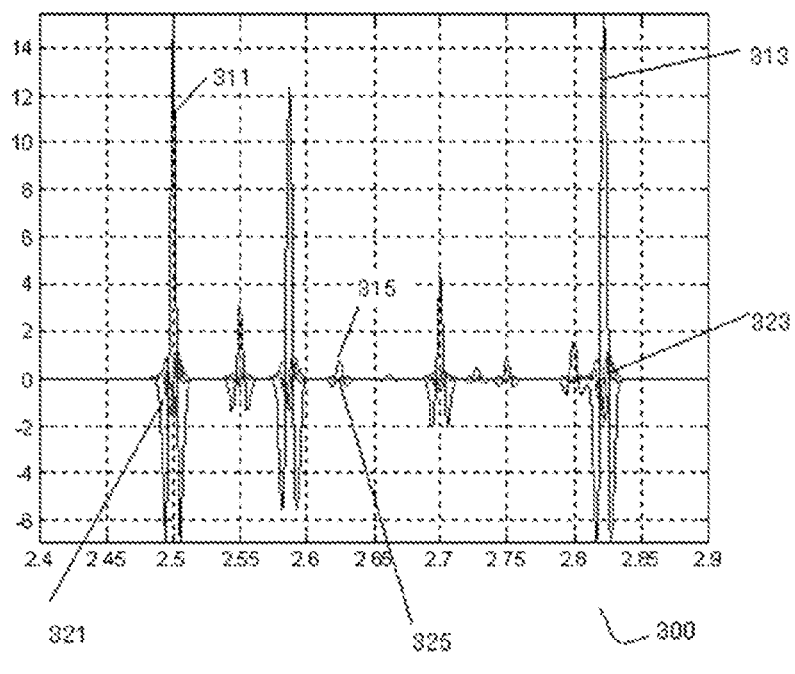
FIG. 3 illustrates an example of a seismogram produced using a method in accordance with an embodiment of the present invention.

FIG. 3 illustrates an example of a seismogram 300 using a random phase shift method in accordance with an embodiment of the present invention. The seismic system is the same as the one shown in FIG. 2, with similar features, such as 311, 313 and 315. The seismogram 300 is the result of a 100 fold stack (average). In this case, compared to FIG. 2, the crosstalk 321, 323, 325 of seismic features between two sources are temporally limited to the features themselves. The strong crosstalk (e.g. 321) corresponding to strong features (e.g. 311) are localized temporally to such strong features, which can tolerate and mask such crosstalk. IN this example, the signal 311 is fourteen times stronger than the crosstalk 321. Moreover, while the crosstalk 321 may be stronger than the signal 315, the crosstalk 321 does not spread to signal 315 temporally. As such, in an aspect of the present invention, the weak signal 315 at 2.62 sec only needs to compete with weak crosstalk 325, which is correspondingly weaker than itself. In this example, because the crosstalk is temporally localized, strong crosstalk, which may overwhelm the weak features, does not spread to the weak features. Thus, in an embodiment of the present invention, the resulting seismogram is clean.

In the above example with random phase shifts, the cancellation works better in aspects of the present invention when the stacking fold N is large. In the example shown in FIG. 3, the stacking fold N is 100. When N is smaller, for example, less than 10, the averaging may not be as satisfactory.

In some embodiments according to the current invention, if the processing is well defined at the time of acquisition and there is some knowledge about the survey area, e.g. the seismic velocity, additional phases may be selected so that the crosstalk is practically zero after multi-channel processing. For example, in such embodiments, if the multi-channel processing comprises an N-fold stack, then the additional phases may be chosen to be evenly distributed over the range $0$-$2\pi$. In this approach, N does not have to be large and can be as little as 2 and/or the phase does not need to vary with frequency.

As an example, in some aspects the chosen-phase method could be used in separating over and under sources, where the over and under sources are spatially located at the same cross-line and in-line locations, but are at slightly different depths, i.e, one source (the upper source) is above the other (the under source or lower source). in an aspect of the present invention, the upper and lower sources may be fired together, but with a relative phase difference that varies from shot to shot. For example, in one approach the phases for a sequence of shots would be (in degrees):

| Shot N | Upper source phase | Lower source phase |
| --- | --- | --- |
| 1 | 0 | +90 |
| 2 | 0 | −90 |
| 3 | 0 | +90 |
| 4 | 0 | −90 |
| 5 | 0 | +90 |
| etc . . . | | |

In this example, the upper source fires with no phase change and the lower source fires with alternating +90 and −90 degrees phase changes. In this case, N is two, and the phases are 2-way evenly distributed.

Let $R(s,\phi)$ be an operator that applies a phase change of $\phi$ at all frequencies to the signal 's'. Notice that for any arbitrary signals:

$R(a1,+90)+R(a2,-90)=R(a1-a2,+90)$.

Thus, if a1 and a2 are the same then $R(a,+90)+R(a,-90)=0$. If a1 and a2 are similar then $R(a1,+90)+R(a2,-90)$ will be small.

The seismograms that would be recorded by the upper and lower sources, without phase shifts, are Un(t) and Ln(t). For accurate processing of seismic data it is desirable to obtain approximations to the Un(t) and Ln(t) from the signal Sn(t) that was actually measured in the survey. The recorded seismograms Sn are each the sum of the corresponding Un and Ln with the applied phase shifts, thus:

$S1=U1+R(L1,+90)$ $S2=U2+R(L2,-90)$ $S3=U3+R(L3,+90)$ $S4=U4+R(L4,-90)$ $S5=U5+R(L5,+90)$ $S6=U6+R(L6,-90)$

To obtain the U from the S, the Sn from adjacent shots is summed:

$$S1+S2 = U1+R(L1,+90)+U2+R(L2,-90)$$
$$= U1+U2+R(L1,+90)+R(L2,-90)$$
$$= U1+U2+R(L1-L2,90).$$

The seismograms from adjacent shots are similar. That is to say that the difference at any time is small compared with the value of the seismogram/signal at that time: $L1(t)-L2(t) \ll L1(t)$ for all t. Thus: $S1+S2=U1+U2$ with error of order $(L1-L2)$ So the approximations to the order $(L1-L2)$ is:

$$U1+U2=S1+S2$$

$$U2+U3=S2+S3$$

$$U3+U4=S3+S4$$

$$U4+U5=S4+S5$$

To obtain the Ln from the Sn a series of phase shifts is applied to the Sn and the resulting adjacent shots are summed using a similar argument, such that:

$$L1+L2=R(S1,-90)+R(S2,+90)$$

$$L2+L3=R(S2,+90)+R(S3,-90)$$

$$L3+L4=R(S3,-90)+R(S4,+90)$$

$$L4+L5=R(S4,+90)+R(S5,-90)$$

In this way, approximations to the Un and Ln are obtained; the sequence of Un and Ln summed over two adjacent shots is obtained. This embodiment of the current invention therefore provides for separating the upper and lower sources at the cost of a spatial smoothing of at most one shot interval. In the method, the crosstalk is of the order of the difference of the seismogram from one shot to the next. It is noted from this example that there is an efficient trading off between the smallness of the lateral gradient (adjacent shots) of seismograms to obtain the vertical gradient (upper- and under-sources).

It is also noted that in this example, the seismograms due to the upper sources and the lower sources are obtained. These two sources are spatially very close. In some operations, the two sources can be next to each other. Thus, the differences can be used to provide the vertical source side gradients. If the sources are co-located in other orientations, other source side spatial gradients may be similarly obtained.

Another simple example of the phase method, in accordance with an embodiment of the present invention, may be used to halve the inline shot interval in a 2D survey. In this case the two sources are located half of the inline interval apart (e.g. 12.5 m apart, assuming a typical inline interval of 25 m) and fired simultaneously after each shot interval (e.g. 10 second interval, which interval produces 25 m forward movement). This provides a series of shot points 12.5 m apart. After separating the seismograms due to the two sources, the seismogram for each source is 25 m apart. Again the relative phases can alternate +90 and −90 degrees and a fold of 2 may be used.

Figure 4:
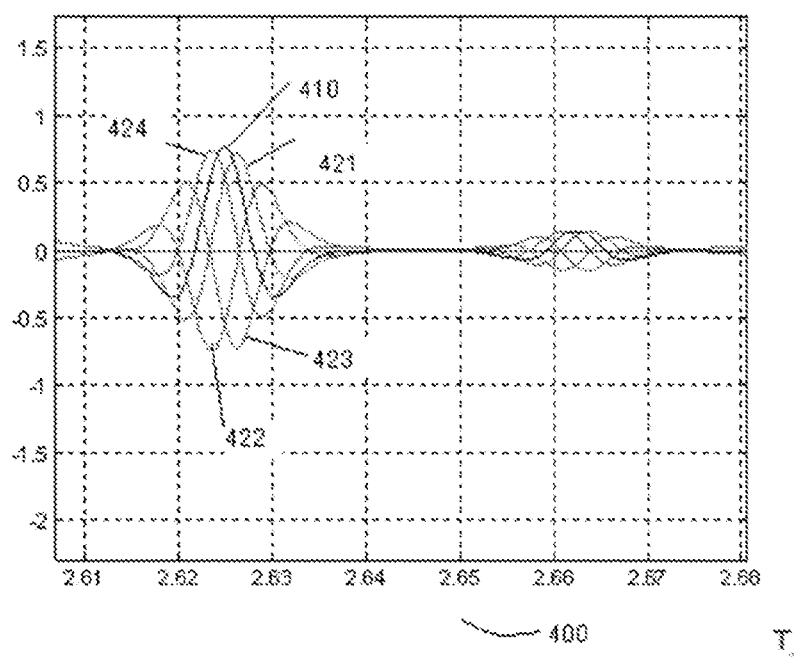
FIG. 4 illustrates an example of a phase diagram in accordance with an embodiment of the present invention.
Figure 5:
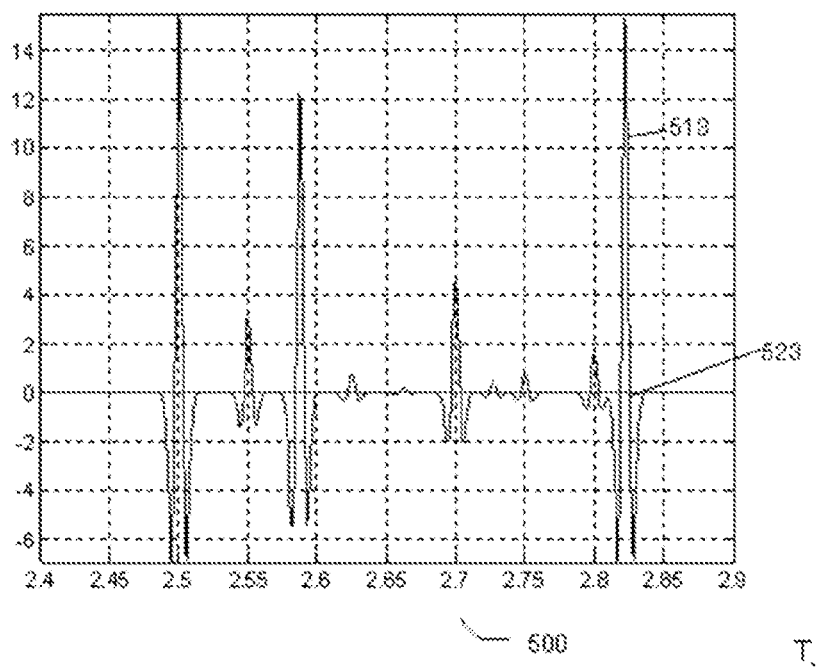
FIG. 5 illustrates an example of a seismogram produced using the phase diagram as in FIG. 4 in accordance with an embodiment of the present invention.

Another simple example is to use a repeating sequence of four relative phases: +45, +135, −135, −45, and a fold of 4. This is illustrated in FIGS. 4 and 5. FIG. 4 illustrates the source signal diagram 400 of two sources. The signal curve 410 of a first source stays the same at each shot, i.e. a 0 degree phase shift. The phases of a second source alters in the sequence of +45, +135, −135 and −45 degrees and the corresponding signal diagrams 421, 422, 423 and 424 change their appearances. FIG. 5 illustrates the result from using the four-fold phase shifts. The seismic features are the same as those in FIGS. 2 and 3. However, even for strong features, e.g. 513, the crosstalk 523 is almost gone. When there is some prior knowledge of the survey and the subsequent processing, the phase shifts between sources may be chosen such that the crosstalk between sources is designed to be cancelled with each other.

In some embodiments of the present invention, for example, when producing simple imaging, the goal is not necessarily to separate the summed seismograms into individual seismograms for each of the simultaneous sources, but rather to produce a seismic image that is an approximation of what would have been obtained had the seismograms been separated. These are not the same thing since each point in the image produced by the simultaneous sources contains a sum of data from several different seismograms from the survey. It is this summation that allows the use of multi-channel processing techniques to generate the approximate image.

In other applications, for example, in advanced processing where the gradient of the Green's function with respect to source position is required, an approximation to the actual separated seismograms is needed and these seismograms can be very similar. The separated seismograms can be obtained using the methods described above. The source-side gradient is simply the difference between the corresponding seismograms and spatial differences of the sources.

In the above discussion and examples, seismic systems with two sources are discussed. This is for discussion simplicity only. In actual operation, there is no limit on how many sources are used. The sources may also be closely located in any direction, inline, crossline or vertically.

The embodiments of the current invention are focused on the phase shift of sweeps of marine vibrators. The sweeps themselves are not concerns of the current invention, so they can be any type of sweep, for example linear sweep, non-linear sweep, down-sweep, up-sweep and/or the like.

The embodiments of the current invention are focused on the sources of simultaneous source activation using marine vibrators. The receivers used in such seismic surveys are not a concern and there is no limitation as to which receivers can be used. Although examples given above are related to towed marine seismic surveys, the methods disclosed in the current invention may also be used in other seismic surveys in the marine environment where marine vibrators are used, for example, vertical seismic profiling (VSP) and ocean bottom cables (OBC) etc.

Embodiments of the present invention may provide methods to acquire marine seismic data using marine seismic vibrators with simultaneous source activation technique. One such method may be summarized as method 600 in FIG. 6, which method provides the following:

Activating a first marine seismic vibrator according to a first sweep (610);
Activating a second marine seismic vibrator according to a second sweep, when the second sweep is the same as the first sweep except for a phase shift (620);
Recording earth responses with receivers (630); and
Processing responses to obtain a seismogram (640).

Figure 6:
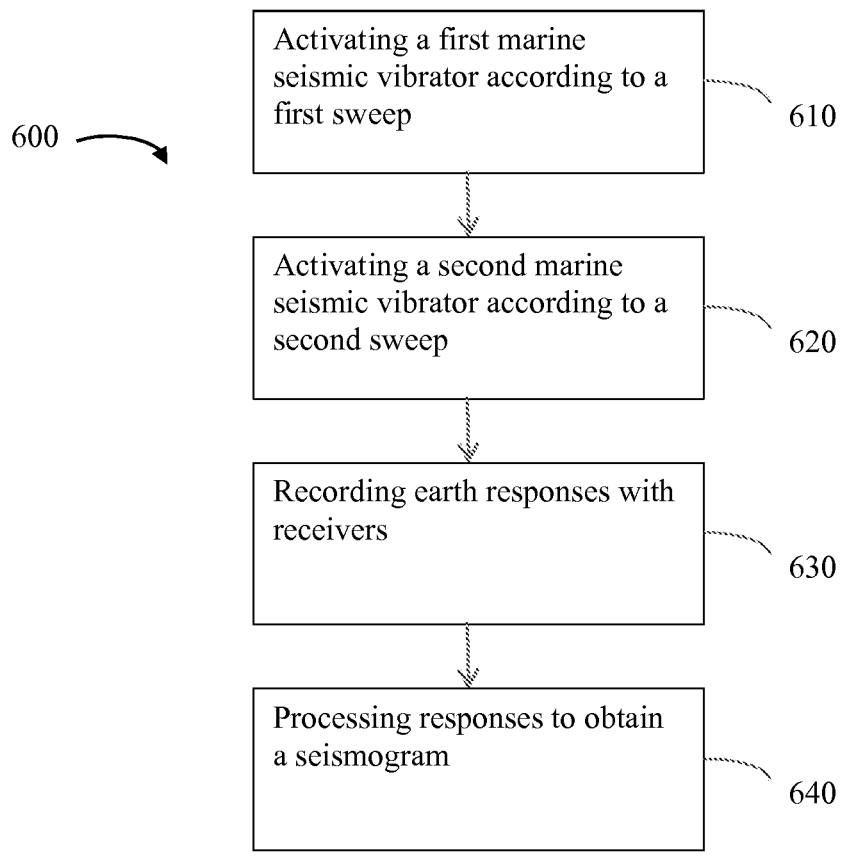
FIG. 6 illustrates a flow diagram of a method used to acquire simultaneous source data using multiple marine vibrators, in accordance with an embodiment of the present invention.

In the method 600 in FIG. 6, in accordance with some embodiments of the present invention, not all actions are carried out, depending on the purpose or goal of a survey. For example, when data acquisition is the only goal, then the data processing parts (e.g. 640) may be left out. The data processing parts may be performed on a later day by a different contractor using a different method.

As discussed above, different procedures or methods may be used to carry out the actions summarized in method 600. For example, the phase shift of the second source (620) may be random or chosen. The seismogram obtained in 640 may be a unique seismogram in response to one source only or a seismogram with responses to all sources.

As those with skill in the art will understand, one or more of the steps of methods discussed above may be combined and/or the order of some operations may be changed. Further, some operations in methods may be combined with aspects of other example embodiments disclosed herein, and/or the order of some operations may be changed. The process of measurement, its interpretation, and actions taken by operators may be done in an iterative fashion; this concept is applicable to the methods discussed herein. Finally, portions of methods may be performed by any suitable techniques, including on an automated or semi-automated basis such as on computing system 700 in FIG. 7.

Figure 7:
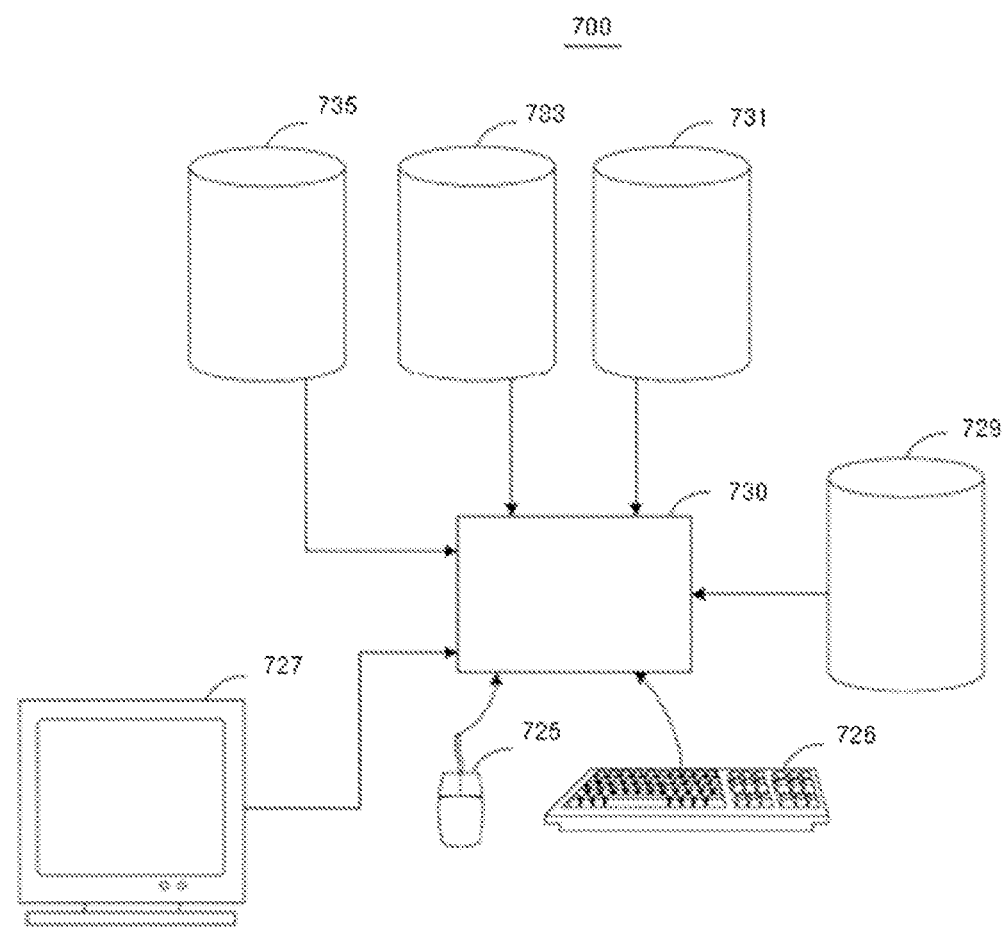
FIG. 7 illustrates a schematic view of a computer system for use in processing data acquired by simultaneous source in accordance with an embodiment of the present invention.

Portions of methods described above may be implemented in a computer system 700, one of which is shown in FIG. 7. The system computer 730 may be in communication with disk storage devices 729, 731, 733 and 735, which may be external hard disk storage devices and measurement sensors (not shown). It is contemplated that disk storage devices 729, 731, 733 and 735 are conventional hard disk drives, and as such, may be implemented by way of a local area network or by remote access. While disk storage devices are illustrated as separate devices, a single disk storage device may be used to store any and all of the program instructions, measurement data, and results as desired.

In one implementation, real-time data from the sensors may be stored in disk storage device 731. Various non-real-time data from different sources may be stored in disk storage device 733. The system computer 730 may retrieve the appropriate data from the disk storage devices 731 or 733 to process data according to program instructions that correspond to implementations of various techniques described herein. The program instructions may be written in a computer programming language, such as C++, Java and the like. The program instructions may be stored in a computer-readable medium, such as program disk storage device 935. Such computer-readable media may include computer storage media. Computer storage media may include volatile and non-volatile media, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the system computer 730. Combinations of any of the above may also be included within the scope of computer readable media.

In one implementation, the system computer 730 may present output primarily onto graphics display 727, or via printer 728 (not shown). The system computer 730 may store the results of the methods described above on disk storage 729, for later use and further analysis. The keyboard 726 and the pointing device (e.g., a mouse, trackball, or the like) 725 may be provided with the system computer 730 to enable interactive operation.

The system computer 730 may be located on-site or at a data center remote from the field. The computer system 730 may be connected with other systems via network link 724 (not shown). The system computer 730 may be in communication with equipment on site to receive data of various measurements. Such data, after conventional formatting and other initial processing, may be stored by the system computer 730 as digital data in the disk storage 731 or 733 for subsequent retrieval and processing in the manner described above.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words 'means for' together with an associated function.

The invention claimed is:

1. A method comprising:
receiving data representing earth responses recorded due to energies emitted by a first marine seismic vibrator and a second marine seismic vibrator while the first marine seismic vibrator and the second marine seismic vibrator are being towed in a marine seismic survey, wherein during the seismic survey:
the first marine seismic vibrator is towed at a spatial offset relative to the second marine seismic vibrator;
the first marine seismic vibrator fires a first time sequence of shots, each shot of the first time sequence being associated with a sweep of seismic frequencies and a shot time, and the shots of the first time sequence being associated with a first phase;
the second marine seismic vibrator fires a second time sequence of shots, each shot of the second time sequence being associated with a sweep of seismic frequencies and being associated with one of the shot times, and the shots of the second time sequence being associated with a second phase;
the second phase varying from shot to shot of the second time sequence of shots;
the second phase varying with respect to the first phase; and
processing the data to source separate the earth responses, comprising:
time separating the earth responses to correspond to sets of adjacent shot times and stacking together the earth responses of each set; and
using results of the processing to determine at least one property of a subterranean section of the earth.

2. The method of claim 1, wherein:
the first phase does not vary from shot to shot of the first time sequence of shots; and
stacking together the earth responses provides seismographs representing earth responses to the energy emitted by the first marine seismic vibrator.

3. The method of claim 1, wherein processing the data further comprises:

phase shifting the recorded earth responses based at least in part on the varying of the second phase;

time separating the phase shifted earth responses to correspond to sets of adjacent shot times; and stacking together the phase shifted earth responses of each set to provide seismographs representing earth responses to the energy emitted by the second marine seismic vibrator.

4. The method of claim 1, wherein the first marine seismic vibrator and the second marine seismic vibrator comprise vibrators arranged in an over-under spread of sources or vibrators arranged in an inline spread of sources.

5. The method of claim 1, wherein the second phase is selected to minimize a crosstalk between the sweeps associated with the first and second marine seismic vibrators.

6. The method of claim 1, wherein the phases of the sweeps associated with the second marine seismic vibrator are evenly distributed according to a minimum available fold.

7. The method of claim 1, wherein the second phase is varied such that the second phase either leads the first phase by ninety degrees or trails the first phase by ninety degrees.

8. A method comprising:

receiving data representing earth responses recorded due to energies emitted by a first marine seismic vibrator and a second marine seismic vibrator while the first marine seismic vibrator and the second marine seismic vibrator are being towed in a marine seismic survey, wherein during the seismic survey:

the first marine seismic vibrator is towed at a spatial offset relative to the second marine seismic vibrator;

the first marine seismic vibrator fires a first time sequence of shots, each shot of the first time sequence being associated with a sweep of seismic frequencies and a shot time, and the shots of the first time sequence being associated with a first phase that does not vary from shot to shot;

the second marine seismic vibrator fires a second time sequence of shots, each shot of the second time sequence being associated with a sweep of seismic frequencies and being associated with one of the shot times, and the shots of the second time sequence being associated with a second phase that varies in a range from zero to a from shot to shot; and processing the data to source separate the earth responses, comprising:

stacking seismographs representing the earth responses to provide at least one seismograph representing earth responses to the energy emitted by the first marine seismic vibrator; and using results of the processing to determine at least one property of a subterranean section of the earth.

9. The method of claim 8, wherein processing the data to source separate the earth responses further comprises:

applying a phase shift operator to the seismographs representing the earth responses; and stacking seismographs resulting from applying the phase shift operator to provide at least one seismograph representing earth responses to the energy emitted by the second marine seismic vibrator.

10. A method comprising:

receiving data representing earth responses recorded due to energies emitted by a first marine seismic vibrator and a second marine seismic vibrator while the first marine seismic vibrator and the second marine seismic vibrator are being towed in a marine seismic survey, wherein during the seismic survey:

the first marine seismic vibrator is towed at a spatial offset relative to the second marine seismic vibrator;

the first marine seismic vibrator fires a first time sequence of shots, each shot of the first time sequence being associated with a sweep of seismic frequencies and a shot time, and the shots of the first time sequence being associated with a first phase that does not vary from shot to shot;

the second marine seismic vibrator fires a second time sequence of shots, each shot of the second time sequence being associated with a sweep of seismic frequencies and being associated with one of the shot times, and the shots of the second time sequence being associated with a second phase that randomly varies from shot to shot; and processing the data to source separate the earth responses, comprising:

stacking seismographs representing the earth responses to provide at least one seismograph representing earth responses to the energy emitted by the first marine seismic vibrator; and using results of the processing to determine at least one property of a subterranean section of the earth.

11. The method of claim 10, wherein processing the data to source separate the earth responses further comprises:

applying a phase shift operator to the seismographs representing the earth responses; and stacking seismographs resulting from applying the phase shift operator to provide at least one seismograph representing earth responses to the energy emitted by the second marine seismic vibrator.

12. An apparatus comprising:

an interface to receive data representing earth responses recorded due to energies emitted by a first marine seismic vibrator and a second marine seismic vibrator while the first marine seismic vibrator and the second marine seismic vibrator are being towed in a marine seismic survey, wherein during the seismic survey:

the first marine seismic vibrator is towed at a spatial offset relative to the second marine seismic vibrator;

the first marine seismic vibrator fires a first time sequence of shots, each shot of the first time sequence being associated with a sweep of seismic frequencies and a shot time, and the shots of the first time sequence being associated with a first phase;

the second marine seismic vibrator fires a second time sequence of shots, each shot of the second time sequence being associated with a sweep of seismic frequencies and being associated with one of the shot times, and the shots of the second time sequence being associated with a second phase;

the second phase varying from shot to shot of the second time sequence of shots;

the second phase varying with respect to the first phase; and a processor to process the data to source separate the earth responses, wherein the processor is adapted to:

time separate the earth responses to correspond to sets of adjacent shot times and stacking together the earth responses of each set; and use results of the stacking to determine at least one property of a subterranean section of the earth.

13. An apparatus comprising:

an interface to receive data representing earth responses recorded due to energies emitted by a first marine seismic vibrator and a second marine seismic vibrator while the first marine seismic vibrator and the second marine seismic vibrator are being towed in a marine seismic survey, wherein during the seismic survey:

the first marine seismic vibrator is towed at a spatial offset relative to the second marine seismic vibrator;

the first marine seismic vibrator fires a first time sequence of shots, each shot of the first time sequence being associated with a sweep of seismic frequencies and a shot time, and the shots of the first time sequence being associated with a first phase that does not vary from shot to shot;

the second marine seismic vibrator fires a second time sequence of shots, each shot of the second time sequence being associated with a sweep of seismic frequencies and being associated with one of the shot times, and the shots of the second time sequence being associated with a second phase that varies in a range from zero to a from shot to shot; and a processor to process the data to source separate the earth responses, wherein the processor is adapted to:

stack seismographs representing the earth responses to provide at least one seismograph representing earth responses to the energy emitted by the first marine seismic vibrator; and use results of the stacking to determine at least one property of a subterranean section of the earth.

14. An apparatus comprising:

an interface to receive data representing earth responses recorded due to energies emitted by a first marine seismic vibrator and a second marine seismic vibrator while the first marine seismic vibrator and the second marine seismic vibrator are being towed in a marine seismic survey, wherein during the seismic survey:

the first marine seismic vibrator is towed at a spatial offset relative to the second marine seismic vibrator;

the first marine seismic vibrator fires a first time sequence of shots, each shot of the first time sequence being associated with a sweep of seismic frequencies and a shot time, and the shots of the first time sequence being associated with a first phase that does not vary from shot to shot;

the second marine seismic vibrator fires a second time sequence of shots, each shot of the second time sequence being associated with a sweep of seismic frequencies and being associated with one of the shot times, and the shots of the second time sequence being associated with a second phase that randomly varies from shot to shot; and a processor to process the data to source separate the earth responses, wherein the processor is adapted to:

stack seismographs representing the earth responses to provide at least one seismograph representing earth responses to the energy emitted by the first marine seismic vibrator; and use results of the stacking to determine at least one property of a subterranean section of the earth.

* * * * *